(12) United States Patent
Väänänen

(10) Patent No.: US 10,057,114 B2
(45) Date of Patent: Aug. 21, 2018

(54) METHOD AND A DEVICE FOR FLOWING DATA BETWEEN ENTITIES

(71) Applicant: Piceasoft Oy, Tampere (FI)

(72) Inventor: Jani Väänänen, Kangasala (FI)

(73) Assignee: PICEASOFT OY, Tampere (FI)

( * ) Notice: Subject to any disclaimer, the term of this patent is extended or adjusted under 35 U.S.C. 154(b) by 209 days.

(21) Appl. No.: 15/061,292

(22) Filed: Mar. 4, 2016

(65) Prior Publication Data

US 2016/0261461 A1 Sep. 8, 2016

(30) Foreign Application Priority Data

Mar. 5, 2015 (FI) .................................. 20155146

(51) Int. Cl.
| | |
|---|---|
| *H04L 12/24* | (2006.01) |
| *G06F 17/30* | (2006.01) |
| *H04L 29/08* | (2006.01) |
| *H04L 29/12* | (2006.01) |
| *H04L 29/06* | (2006.01) |
| *G06F 21/30* | (2013.01) |

(52) U.S. Cl.
CPC .... *H04L 41/0803* (2013.01); *G06F 17/30575* (2013.01); *G06F 17/30902* (2013.01); *G06F 21/305* (2013.01); *H04L 29/08* (2013.01); *H04L 61/1511* (2013.01); *H04L 61/2007* (2013.01); *H04L 63/0236* (2013.01); *H04L 63/12* (2013.01); *H04L 63/168* (2013.01); *H04L 67/02* (2013.01); *H04L 67/025* (2013.01)

(58) Field of Classification Search
CPC ..... H04L 41/0803; H04L 29/08; H04L 63/12; H04L 67/02

USPC ........................................................ 709/220
See application file for complete search history.

(56) References Cited

U.S. PATENT DOCUMENTS

| | | | |
|---|---|---|---|
| 7,089,259 B1 | 8/2006 | Kouznetsov et al. | |
| 2008/0098301 A1* | 4/2008 | Black ................. | H04L 67/1008 715/246 |
| 2010/0125651 A1* | 5/2010 | Zapata .................... | G06F 8/65 709/220 |

(Continued)

FOREIGN PATENT DOCUMENTS

| | | |
|---|---|---|
| EP | 2690555 A2 | 1/2014 |
| FI | 125649 B | 12/2015 |

OTHER PUBLICATIONS

Anonymous, "Third-Party Signed SSL Certificate for localhost/1.0.0.1?—Stack Overflow", Sep. 14, 2014, Retrieved from the Internet at https://web.archive.org/web/20140914194754, http://stackoverflow.com/questions/6793174/third-party-signed-ssl-certificate-for-localhost-127-0-0-1, 2 pages.

(Continued)

*Primary Examiner* — Wing F Chan
*Assistant Examiner* — Leon Y Tseng
(74) *Attorney, Agent, or Firm* — Ziegler IP Law Group, LLC

(57) ABSTRACT

A method for managing a configuration of a first device, the method comprising connecting the first device to a second device comprising a local server for managing network services within the second device; and controlling, by a web browser application implemented on said second device, an operation of the local server such that the configuration of the first device is manageable via the web browser application.

7 Claims, 3 Drawing Sheets

(56) References Cited

U.S. PATENT DOCUMENTS

2015/0116089 A1    4/2015    Enomoto

OTHER PUBLICATIONS

Anonymous, "Bump (application)—Wikipedia, the free encyclopedia", Feb. 25, 2015, Retrieved from the Internet at https://en.wikipedia.org/w/index.php?title=Bump_(application)&oldid-648823875, 5 pages.
Anonymous, "Trust anchor—Wikipedia, the free encyclopedia", Jan. 24, 2015, Retrieved from the Internet at https://en.wikipedia.org/w/index.php?title=Trust_anchor&oldid=643897047, 1 page.
Extended European Search Report, Application No. 16397504.8-1952, dated May 3, 2016, 13 pages.
Office Action, Finnish Patent Application No. 20155146, Finnish Patent and Registration Office dated Jun. 18, 2015, 6 pages.
Communication of Acceptance, Finnish Patent Application No. 20155146, Finnish Patent and Registration Office dated Oct. 14, 2015, 22 pages.

* cited by examiner

METHOD AND A DEVICE FOR FLOWING DATA BETWEEN ENTITIES

FIELD OF THE INVENTION

This invention relates to flowing of data from an entity to another entity.

BACKGROUND OF THE INVENTION

Nowadays people typically have many electronic devices comprising memory, and in the memory various classes of data, such as data representing music, data representing images, and data representing videos. Music, images, and/or videos may have been recorded using a mobile electronic device, such as a mobile phone. A user may want to have the same, or at least substantially the same data in various devices, such as, in addition to the mobile phone, another mobile phone, a tablet computer, an mp3 player, or an electronic document reader.

A common situation for copying personal content from a first mobile device to second mobile device may happen when a user is buying a new mobile device. The old mobile device may comprise various kind of personal content, such as contact information, calendar data, messages, bookmarks, various files, such as music, photo and/or video files and documents, various applications, etc. The user may wish to copy all or a part of the personal content from the old device to the new device.

It would be convenient for the user if the personal content could be copied immediately at the store when buying the new mobile device. The known copying and synchronization methods typically involve copying the content from the old device to a computer or a server, managed e.g. by the store, and then copying the content from the computer or the server to the new device. However, people tend to be reluctant to allow their personal content to be copied to any external computer.

The same applies also, when the user brings his/her device to maintenance service; the user wants to be sure that the personal content on the device is not copied to any external computer. Therefore, there is a need for a more secure process for flowing data from an entity to another entity.

SUMMARY OF THE INVENTION

Now an improved arrangement has been developed to alleviate the above-mentioned problems. As different aspects of the invention, there is provided a method, an apparatus and a computer program product, which are characterized in what will be presented in the independent claim. The dependent claims disclose advantageous embodiments of the invention.

According to a first aspect, there is provided a method for managing a configuration of a first device, the method comprising connecting the first device to a second device comprising a local server for managing network services within the second device; and controlling, by a web browser application implemented on said second device, an operation of the local server such that the configuration of the first device is manageable via the web browser application.

According to an embodiment, said web browser application controls the operation of the local server over a HTTPS connection to a localhost address of the local server.

According to an embodiment, the localhost address of the local server is mapped to a second network address in a domain name server, the method further comprises requesting, by said web browser application, an IP address of the second network address from the domain name server; and obtaining the localhost address of the local server as the IP address of the second network address.

According to an embodiment, said second network address is provided with a certificate for a secure connection, the method further comprises requesting, by said web browser application, a secured connection to the local server; sending, to a certificate provider, a request to verify the certificate of the second network address; and establishing, upon receiving a verification acknowledgement from the certificate provider, a secured connection to the local server using the certificate of the second network address.

According to an embodiment, wherein upon detecting by the web browser application that the local server lacks an application capable of HTTPS connections, the method further comprises obtaining, by said web browser application, an installation package for said application from a predefined network address; installing said application on said web browser application and on the local server; and starting the local server.

According to an embodiment, the managing the configuration of the first device comprises carrying out diagnostics on the first device or erasing a memory of the first device.

According to an embodiment, the method further comprises controlling, by the web browser, an operation of the local server such that a data flow from the first device is stored in a volatile memory of the second device; and controlling, by said web browser application, the local server to provide the data flow to a third device connected to the second device.

According to an embodiment, the local server controls drivers of said first and third device to provide the data flow between the first and third device via the volatile memory of the second device.

The second and the thirds aspect of the invention disclose an apparatus and a computer program product arranged to carry out the above method.

DETAILED DESCRIPTION OF THE EMBODIMENTS

Figure 1A:
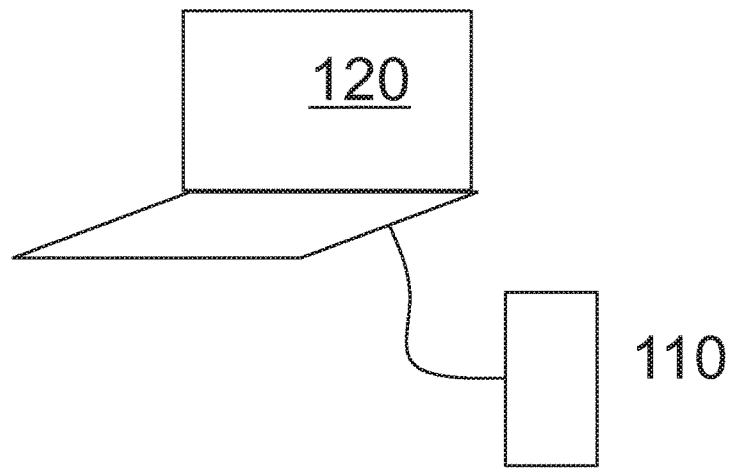
FIG. 1a shows an example of a configuration, wherein a management of a configuration of at least a first device is enabled from a second device.

The examples of various embodiments described herein below relate to managing a configuration of at least a first device, such as a mobile device, connected to a second device, such as a computer. With an appropriate configuration of a web browser and a local server of the second device, explained further in detail below, a method with enhanced security and simplified implementation is provided for managing the configuration of at least the first device.

The embodiments and various use cases related thereto may be useful, for example, to retail sellers and maintenance services of various electronic devices, such as mobile phones, smart phones, tablets, cameras, etc.

One example use case may relate to carrying out diagnostics to a device. An old or a malfunctioning first device, such as a smartphone, may be connected to the second device, such as a laptop. The diagnostics may involve checking the configuration of the first device, such as versions of used software and applications, need for updates, whether any malware has been installed, etc. The diagnostics may also involve various tests to be performed on the first device to troubleshoot any malfunctions. A test routine may be run on the first device to check whether it needs a thorough service or if a minor malfunction can be repaired on-site.

Another use case may relate to erasing a memory of a used device. For example, when giving up the use of an old mobile device, the user of the mobile device may wish to make sure that all his/her personal data is permanently erased from the memory of the old mobile device. There are various methods for carrying out the actual low-level (deep) erasing procedure, such as overwriting the data several times, resets the values of every magnetic domain to zero, etc. The various embodiments described herein provide a secure and simplified framework for carrying out the erasing procedure.

Especially, one example use case of the embodiments relate to copying personal content from a first mobile device to second mobile device, for example when a user is buying a new mobile device. The old mobile device may comprise various kind of personal content, such as contact information, calendar data, messages, bookmarks, various files, such as music, photo and/or video files and documents, various applications, etc. The user may wish to copy, as a data flow, all or a part of the personal content from the first (old) device to the second (new) device.

It is, however, noted that the embodiments described herein below are by no means limited to copying personal content from a first mobile device to second mobile device, but the devices (or entities) and the data flow should be interpreted broadly. In this description, the term data flow refers to copying data from a first entity to a second entity. The data flow may optionally refer to copying data to a third entity, either from the first entity or the second entity. As is clear from this expression, an entity is arranged to at least receive data, store data, and send data. Moreover, as the roles of the first and second entities can be changed, data flow may be, in addition to being one directional, also two directional (i.e. also from the second entity to the first entity).

The term entity refers to a physical device or a virtual device. Examples of physical devices include a computer, a portable memory device, a camera, a video recorder, an audio recorder, a mobile phone, an audio player, a video player, a set-top unit (i.e. a set top box), a viewer for digital images, a GPS-logger, and a navigator. Examples of virtual device include a computer network accessible memory storage (e.g. Google drive, Skydrive, Dropbox, Cloud drive), a computer network accessible service (e.g. Flickr, Instagram), or a computer network accessible social network (e.g. Facebook, Twitter). The term entity may also refer to a combination of a physical and a virtual device. E.g. an entity may be a mobile phone that accesses a computer network accessible memory storage. Examples of such memory storages were given above. As is evident, also other physical devices, such as lap top computers, tablet computers, digital media boxes (set-top boxes, cable boxes, set-top units), may be connected to computer network services, whereby transferring data to/from the device might imply also data transfer to/from a computer network service.

In some embodiment described herein below, the data flow is carried out from the first entity to the second entity via another entity. Examples include a mobile phone and a USB memory stick, both attached to a computer (whereby the computer becomes a third entity); wherein the data flows from the mobile phone to the memory stick via the computer. Other examples include a digital camera connected to a computer, and the computer being further connected to a service provider, such as Flickr, Facebook, or Instagram, whereby data may flow from the camera to the service provider through the computer.

Currently many people have several devices where they store contacts, calendar data, and messages, for example a business phone and a phone for free time. The data flow, as described herein, may be used to keep this data synchronized (i.e. in synchronization or in sync) in all the specified devices.

FIG. 1a shows an embodiment, wherein a management of a configuration of at least a first device from a second device is enabled. In particular, the computer 120 (second device) is arranged to manage the configuration of the first mobile device 110 (first device). The first device is connected to the computer through a wired connection, for example a USB (Universal Serial Bus) connection. Nevertheless, instead of the wired connection, a wireless connection, such a Bluetooth or a WiFi connection, may be used to connect the first device to the second device.

Figure 1B:
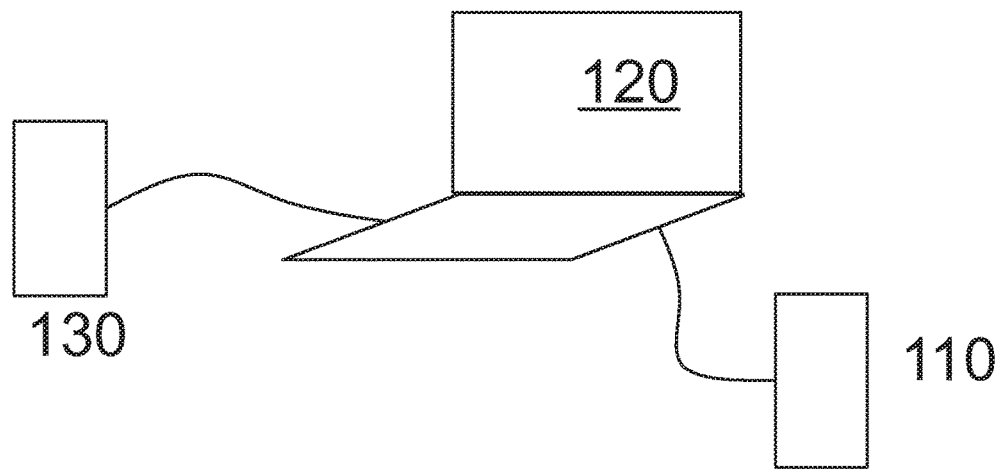
FIG. 1b shows an example of a configuration, wherein data flow is enabled between two entities.

FIG. 1b shows an embodiment, wherein a data flow between two entities (devices) is enabled. In particular, data flow from a first mobile device 110 (first entity) to a second mobile device 130 (third entity) is enabled. The computer 120 in between the first and the second entity form a second entity 120. In this example, the first and the third devices are connected to the computer through a wired connection, for example a USB (Universal Serial Bus) connection. Again, instead of the wired connection, a wireless connection, such a Bluetooth or a WiFi connection, may be used to connect the first and/or the third device to the second device. The wired/wireless connection enables data transfer from the first mobile device 110 to the computer 130, and from the computer 130 to the second mobile device 120.

Figure 2A:
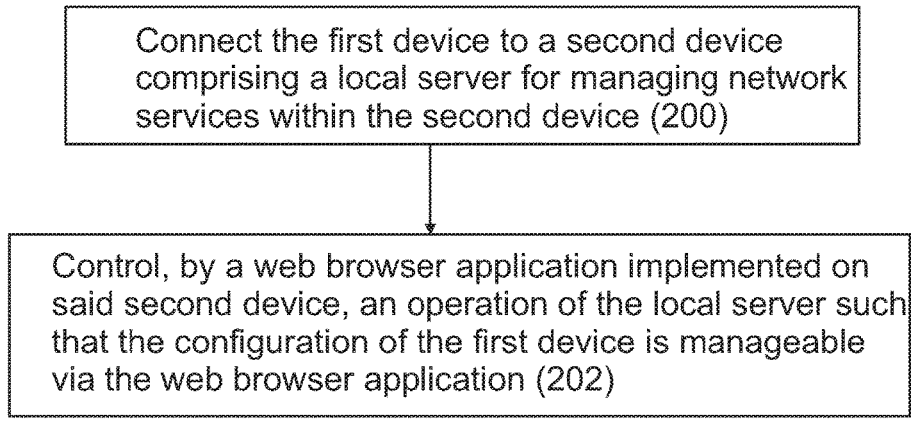
FIG. 2a shows a flow chart for an embodiment for enabling a management of a configuration of at least a first device.

FIG. 2a shows a flow chart of the corresponding method, wherein a configuration of at least a first device is managed. With reference to FIG. 2, an embodiment of the method comprises connecting (200) the first device to a second device comprising a local server for managing network services within the second device. A web browser application implemented on said second device controls (202) an operation of the local server such that the configuration of the first device is manageable via the web browser application.

The second device, such as a Windows-based computer, typically comprises a local server, i.e. an application for controlling local devices, i.e. devices internally or externally connected to computer's own network services. Thus, by arranging a web browser application of the second device to operate such that it is enabled to control the operation of the local server, the local server may be controlled to manage the configurations of the first device. Thus, the operations relating to managing the configurations may be advantageously carried out locally within the browser environment instead of a separate application carrying out operations. This provides a simplified implementation for the service and a more secured process for the data of the user. Managing the configurations may involve e.g. tasks relating to diagnostics or erasing the memory of the first device, as described above.

From the viewpoint of a service provider (e.g. retail seller, maintenance service, etc.) providing such configuration management services, the above arrangement provides the advantage that the services can be offered as an integral part of the service provider's own web site. In other words, no implementation of any application-specific software or hardware is required, but the service may be immediately offered to any customer of the service provider as a web-based service. No authentication keys are required for the service, and the service is always up-to-date; no software updates are required.

Figure 2B:
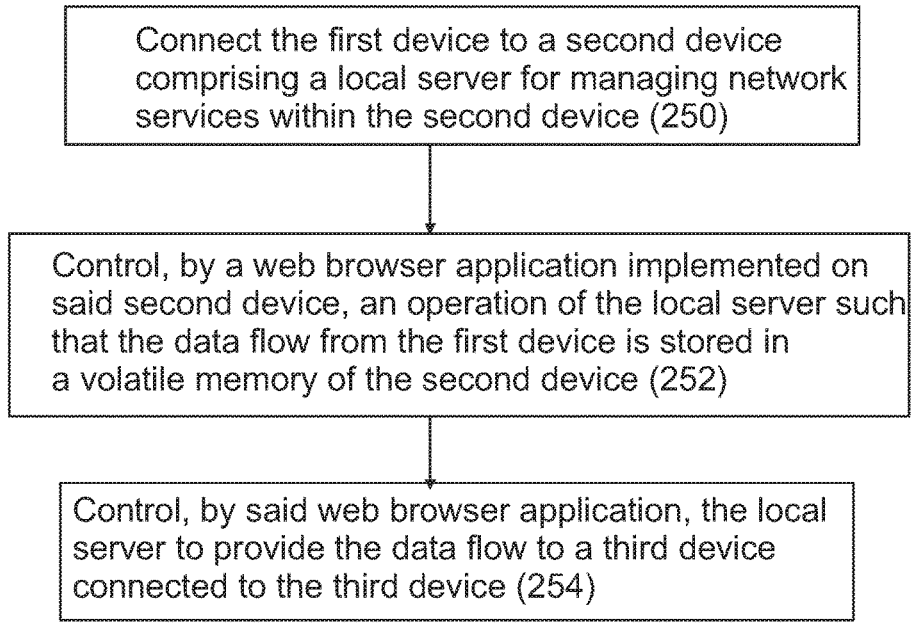
FIG. 2b shows a flow chart for an embodiment for enabling a data flow.

FIG. 2b shows a flow chart of a method corresponding to embodiment of FIG. 1b, wherein the data flow is provided from a first device to a third device. With reference to FIG. 2b, an embodiment of the method comprises connecting (250) the first device to a second device comprising a local server for managing network services within the second device. A web browser application implemented on said second device controls (252) an operation of the local server such that the data flow from the first device is stored in a volatile memory of the second device. Then said web browser application controls (254) the local server to provide the data flow to the third device connected to the second device.

Herein, by arranging the web browser application of the second device to operate such that it is enabled to control the operation of the local server, the local server may be controlled to copy the data flow from the first device only to a volatile memory of the second device, and from there further to the third device. In other words, the data flow is not at any stage stored in permanently to a non-volatile memory of the second device or a network server. After the data flow copying process has been completed, the data will be erased from the volatile memory. Thereby, a more secured process of copying personal content is provided to users.

It is noted that the above data flow copying process may involve data conversion carried out in the second device (e.g. a computer). As known, all devices do not work with all types of files. For example, a device with the Windows operating system may work only with windows supported files. In a similar manner, a device with the Apple's operating system may work only with Apple OS supported filed. According to an embodiment, the second device may comprise a list of valid data formats for an entity is useful, and in an embodiment, a configuration database comprises, in association with the third device (i.e. an identity of the third device), the list of valid data formats for the third device. The list of valid data formats for the third device may depend of the operating system (OS) of the third device. For example other video formats are valid to a device with the Windows OS than to a device with the Apple OS. The configuration database may comprise, in association with the identity of the third device, information on the OS of the third device. The configuration database, or another database, may comprise the list of valid file formats for the OS of the third device. Therefore, in an embodiment of a method, a file (i.e. some data) from the first device is converted to converted data such that the format of the converted data is valid for the third device.

According to an embodiment, in the above process the first and third devices need not to be simultaneously connected to the second device. The first device may be connected first, and the data flow is then copied to the volatile memory of the second device. The third device may connected to the second device afterwards for copying the data flow from the volatile memory of the second device, regardless of the first device still being connected to the second device.

According to an embodiment, said web browser application controls the operation of the local server over a HTTPS connection to a localhost address of the local server.

According to an embodiment, the local server controls drivers of said first and third device to provide the data flow between the first and third device via the volatile memory of the second device. Herein, the local server may have access to a file comprising driver specifications of the first and third device, such as a Setup Information file (INF file) for the installation of software and drivers, and the local server may control the drivers of the first and third device such that the data flow is enabled.

According to an embodiment, the localhost address of the local server is mapped to a second network address in a domain name server, the method further comprises requesting, by said web browser application, an IP address of the second network address from the domain name server; and obtaining the localhost address of the local server as the IP address of the second network address. Thus, for initiating the HTTPS connection, the browser is first controlled to contact to an external network address, and via the DNS mapping, the localhost IP address of the computer is returned to the browser. This enables the browser to communicate to with HTTP localhost address even if operating in HTTPS domain According to an embodiment, said second network address is provided with a certificate for a secure connection, the method further comprises requesting, by said web browser application, a secured connection to the local server; sending, to a certificate provider, a request to verify the certificate of the second network address; and establishing, upon receiving a verification acknowledgement from the certificate provider, a secured connection to the local server using the certificate of the second network address.

The localhost IP address of the computer cannot typically be granted a certificate for a secured connection. Herein, the second (external) network address is utilized for providing a certificate for HTTPS connection to the localhost address via the DNS mapping. The browser presumes that it is communicating with the external HTTPS domain; in other words, the address field of the browser shows the second (external) network address, but the IP address of the connection is actually to 127.0.0.1.

According to an embodiment, upon detecting by the web browser application that the local server lacks an application capable of HTTPS connections, the method further comprises obtaining, by said web browser application, an installation package for said application from a predefined network address; installing said application on said web browser application and on the local server; and starting the local server.

Thus, when starting the operation of the browser to control the local server for the first time, installation of an application enabling the communication between the browser and the local server may be needed. The installation may involve computer codes, such as javascripts, to be installed both on the browser and the local server for controlling the local server to listen to commands sent by the browser to the localhost address over an HTTPS connection. The local server may use any free TCP port for listening the incoming HTTP/HTTPS connections. Both the local server and the browser shall preferably know what TCP port is used.

Figure 3:
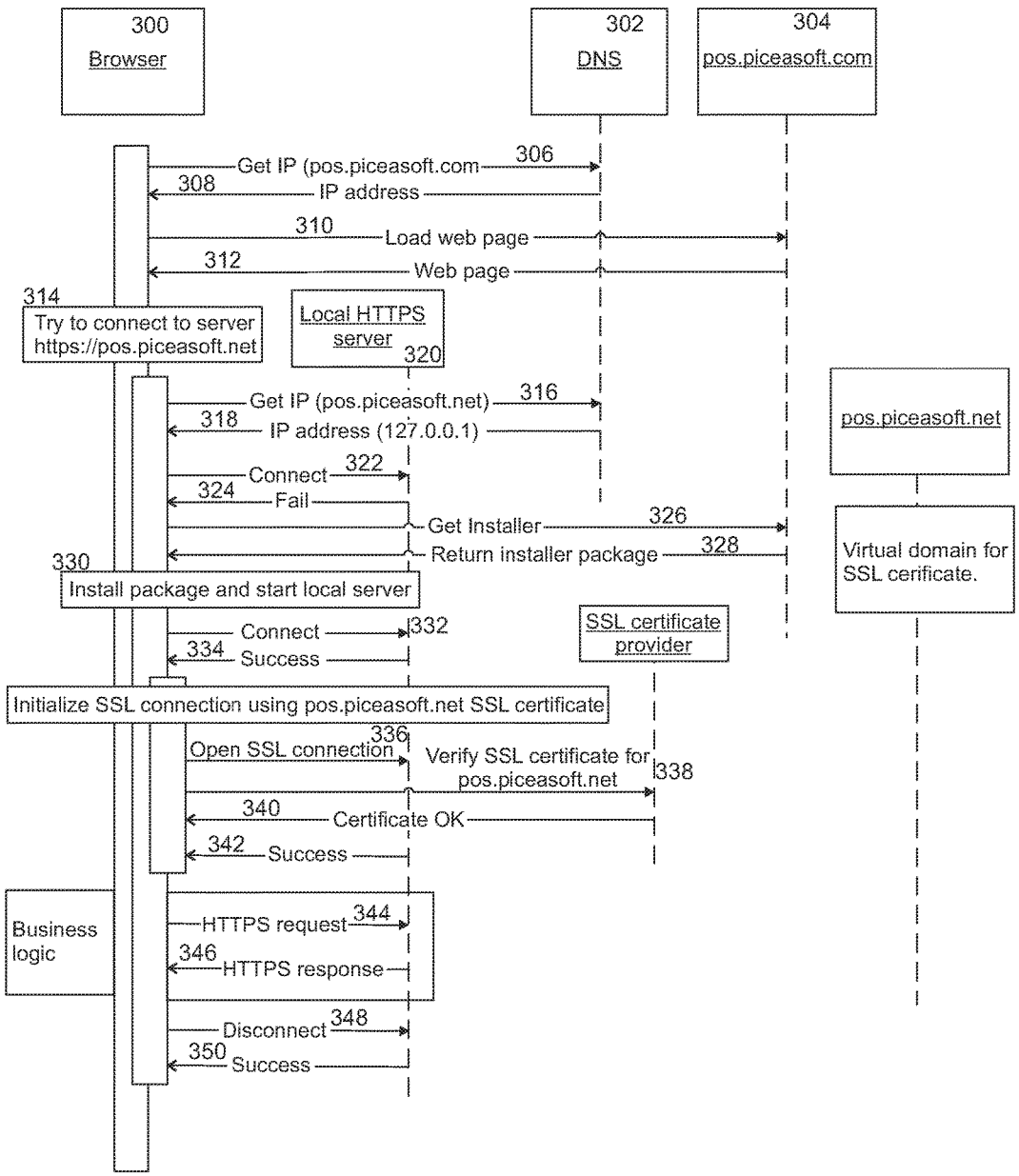
FIG. 3 shows a signalling chart for an embodiment for enabling a data flow.

Various embodiments described herein are now further illustrated by referring to a signaling chart of FIG. 3. The signaling chart of FIG. 3 shows an example how the browser 300 can be arranged to control local devices, i.e. devices internally or externally connected to computer's own network services. The arrangement comprises a Domain Name Server (DNS, 302) and a WWW server 304 provided with a first domain name (e.g. pos.piceasoft.com) according to an HTTP protocol. The DNS 302 and the WWW server 304 may be controlled by the same entity such that access to said servers may be restricted to only certain IP addresses. The same or another WWW server 304 may host a second domain name (e.g. pos.piceasoft.net), which may be a virtual domain name, for which a certificate, such as a SSL (Secure Sockets Layer) or a TLS (Transport Layer Security) certificate, may be obtained from a certificate provider in order to establish secure HTTPS connections.

For arranging the browser to get in control of the local devices, the browser first tries to connect the first domain name. Thus, the browser sends a request 306 for the IP address of the first domain name to the DNS, and receives 308 the IP address. The browser then send a request 310 for loading a particular web page associated to said first domain name, whereupon the requested web page 312 is loaded to the browser. The web page 312 may comprise a computer code 314, such as javascript, which may either prompt the user of the browser or control the browser directly to connect to the second (virtual) domain name using a secured (e.g. HTTPS) connection. The browser may initiate a new thread for the connection, and sends a request 316 for the IP address of the second domain name to the DNS. The second domain name has been mapped to the localhost address (typically 127.0.0.1) in the DNS, and the browser then receives 318 the IP address of the localhost of its own computer.

However, uncertified connections to a local HTTP server 320 cannot typically be established, and therefore establishing the connection 322 from the browser is failed 324. The script may now either prompt the user of the browser or control the browser directly to connect to the first domain name for requesting 326 loading of an installer for an application. An installer package 326 is returned to the browser.

The user of the computer may then run the installation 330 of the application, whereupon the application may install computer codes, such as javascripts, both on the browser 300 and the local HTTP server 320, which computer codes control the local HTTP server to listen to commands sent by the browser to the localhost address over an HTTPS connection. The latest web page may remain open in the browser, After the installation, the local HTTP server may be automatically (re-)started, and the browser starts to polls the predefined TCP port. The local HTTP server continues to listen to the TCP port, and the browser preferably notices that the local HTTP server is in the listening mode.

It is noted that in this embodiment the above steps are only needed when for the first time arranging the browser to control the local devices, and thereby installing the application. For the second and any subsequent time, the operation may start from the next steps.

The browser may start to establish a secured HTTPS connection by connecting 332 to the local HTTP server, which acknowledges 334 the successful initialization of the connection. The browser then starts to open 336 a certified connection, such a SSL/TLS connection for obtaining a verified certificate for the HTTPS connection. Herein, verification of the certificate of the second domain name is requested 338 from a SSL/TLS certificate provider, and upon receiving the verification of the certificate 340, the HTTPS connection between the browser and the local HTTP server has been successfully established 342.

Now the browser 300 may control the operation of the local HTTP server 320 by sending commands 344 to the localhost address over an HTTPS connection, and the local HTTP server responds 346 accordingly. In this respect, it is irrelevant what are the actual operations carried out by said commands. The examples disclosed herein relate to copying personal content from a first mobile device to second mobile device, but the operations may relate to any other corresponding operation.

When considering, for example, the process of copying personal content from a first mobile device to second mobile device, it is irrelevant for the above steps whether the first and/or the second device have been connected to the computer (server) carrying out the above steps. It is possible to connect first and/or the second device to the computer (server) only at this stage.

After carrying out all the necessary operation, the browser may disconnect 348 the HTTPS connection and the local server may confirm 350 that the HTTPS connection is successfully disconnected.

In the above process of providing a data flow between to devices, there may occur a situation where the driver of the first and/or the third device is unknown the second device. It is also possible that such situation may occur irrespective of any process of providing a data flow between two or more devices.

The second device, typically a computer, is most often a Windows-based device. Windows uses a Setup Information file (INF file) for the installation of software and drivers, for example for installing device drivers for hardware components. In the present case, if the first and/or the third device is using another operating system, such as Android, it may easily happen that the driver of the first and/or the third device is not recognized by the INF file of the third device.

According to an embodiment, which may be implemented combined with any of the above embodiments or as an independent method, the second device may be arranged to automatically generate a driver for an unknown device with a required USB interface.

A method according to such an embodiment may comprise connecting a first device to a computer, determining automatically at least a vendor identifier (vid) and a product identifier (pid) of the first device, and upon detecting that no driver exists for such combination of a vendor identifier (vid) and a product identifier (pid) in the computer, sending a request with at least the vendor identifier (vid) and the product identifier (pid) to a public driver generator server for obtaining the corresponding driver.

According to an embodiment, the computer may determine automatically an interface identifier (iid) of the first device, and the interface identifier (iid) may be sent along the request to the public driver generator server. The interface identifier may refer to the link layer identification (e.g. USB) used by the first device.

The identifiers may be determined e.g. such that when the first device is connected to the computer, for example via a USB connection, the first device is controlled to shift into a debugging mode, wherein the computer may determine the vendor identifier (vid), the product identifier (pid) and the interface identifier (iid) of the first device. For example, Android devices may be controlled into a debugging mode using an ADB (Android Debugging Bridge) client in the computer.

If the public driver generator server comprises the corresponding driver, it may send it to the computer, which may then update the INF file. However, if the public driver generator server does not comprise the corresponding driver, it may send a request for the driver to a private windows server.

According to an embodiment, the private server may generate an INF file based on the vendor identifier (vid), the product identifier (pid) and the interface identifier (iid) of the first device, generate a Windows catalog file and sign the catalog file.

In Windows, a signed catalog file (.cat) can be used as a digital signature for an arbitrary collection of files. A catalog file contains a collection of cryptographic hashes, where each hash in the catalog file corresponds to a file that is installed by the driver package.

According to an embodiment, a generic driver is used for an unknown device, and the INF file is generated on the basis of the generic driver. For example, for USB connection Windows comprises a generic winusb-driver, which can be used as a basis for the INF file generation.

The private windows server may then send the generated and signed INF file to the public driver generator server, and it may send it further to the computer. In the computer, a Windows enabler system service may be provided, which may automatically install the generated INF file. Thus, the new driver is automatically installed and shown in the application without any user intervention required.

A skilled man appreciates that any of the embodiments described above may be implemented as a combination with one or more of the other embodiments, unless there is explicitly or implicitly stated that certain embodiments are only alternatives to each other.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the terminal device to carry out the features of an embodiment.

It is obvious that the present invention is not limited solely to the above-presented embodiments, but it can be modified within the scope of the appended claims.

The invention claimed is:

1. A method for managing a configuration of a first device, the method comprising
connecting the first device to a second device comprising a local server for managing network services within the second device;
controlling, by a web browser application implemented on said second device, an operation of the local server over a Hypertext Transfer Protocol Secure (HTTPS) connection to a localhost address of the local server, wherein the localhost address of the local server is mapped to a second network address in a domain name server,
requesting, by said web browser application, an Internet Protocol (IP) address of the second network address from the domain name server;
obtaining the localhost address of the local server as the IP address of the second network address, wherein said second network address is provided with a certificate for a secure connection;
requesting, by said web browser application, the secured connection to the local server;
sending, to a certificate provider, a request to verify the certificate of the second network address;
establishing, upon receiving a verification acknowledgement from the certificate provider, the secured connection to the local server using the certificate of the second network address; and
managing the configuration of the first device via the web browser application over said HTTPS connection to the localhost address of the local server.

2. The method of claim 1, wherein upon detecting by the web browser application that the local server lacks an application capable of HTTPS connections, the method further comprises
obtaining, by said web browser application, an installation package for said application from a predefined network address;
installing said application on said web browser application and on the local server; and
starting the local server.

3. The method of claim 1, wherein the managing the configuration of the first device comprises carrying out diagnostics on the first device or erasing a memory of the first device.

4. The method of claim 1, further comprising
controlling, by the web browser, an operation of the local server such that a data flow from the first device is stored in a volatile memory of the second device; and
controlling, by said web browser application, the local server to provide the data flow to a third device connected to the second device.

5. The method of claim 4, wherein the local server controls drivers of said first and third device to provide the data flow between the first and third device via the volatile memory of the second device.

6. An apparatus comprising at least one processor, a memory including computer program code, and a local server for managing network services within the apparatus, the memory and the computer program code configured to, with the at least one processor, cause the apparatus to at least:
control, upon connecting an external device to the apparatus, by a web browser application implemented on said apparatus, an operation of the local server over a Hypertext Transfer Protocol Secure (HTTPS) connection to a localhost address of the local server, wherein the localhost address of the local server is mapped to a second network address in a domain name server,
request, by said web browser application, an Internet Protocol (IP) address of the second network address from the domain name server;
obtain the localhost address of the local server as the IP address of the second network address, wherein said second network address is provided with a certificate for a secure connection;
request, by said web browser application, the secured connection to the local server;
send, to a certificate provider, a request to verify the certificate of the second network address;

establish, upon receiving a verification acknowledgement from the certificate provider, the secured connection to the local server using the certificate of the second network address; and manage the configuration of the external device via the web browser application over said HTTPS connection to the localhost address of the local server.

7. A computer program product comprising computer program code embodied on a non-transitory computer readable storage medium, wherein said computer program code is, when executed on a processor of a computer comprising a local server for managing network services within the computer, arranged to cause the computer to at least:

control, upon connecting an external device to the computer, by a web browser application implemented on said computer, an operation of the local server over a Hypertext Transfer Protocol Secure (HTTPS) connection to a localhost address of the local server, wherein the localhost address of the local server is mapped to a second network address in a domain name server, request, by said web browser application, an Internet Protocol (IP) address of the second network address from the domain name server;

obtain the localhost address of the local server as the IP address of the second network address, wherein said second network address is provided with a certificate for a secure connection;

request, by said web browser application, the secured connection to the local server;

send, to a certificate provider, a request to verify the certificate of the second network address;

establish, upon receiving a verification acknowledgement from the certificate provider, the secured connection to the local server using the certificate of the second network address; and manage the configuration of the external device via the web browser application over said HTTPS connection to the localhost address of the local server.

* * * * *